(12) United States Patent
Smith

(10) Patent No.: US 7,745,799 B2
(45) Date of Patent: Jun. 29, 2010

(54) DETECTOR FOR AIBORNE ALPHA PARTICE RADIATION

(76) Inventor: Arthur Ernest Smith, 2 Hoggs Lane, Chorley, Lancashire (GB) PR7 4AA ( * ) Notice: Subject to any disclaimer, the term of this patent is extended or adjusted under 35 U.S.C. 154(b) by 223 days.

(21) Appl. No.: 10/381,758

(22) PCT Filed: Sep. 26, 2001

(86) PCT No.: PCT/GB01/04266

§ 371 (c)(1),
(2), (4) Date: Mar. 31, 2003

(87) PCT Pub. No.: WO02/33441

PCT Pub. Date: Apr. 25, 2002

(65) Prior Publication Data

US 2004/0031928 A1    Feb. 19, 2004

(30) Foreign Application Priority Data

Oct. 19, 2000  (GB) ................. 0025617.2

(51) Int. Cl.
*G01T 1/185* (2006.01)
(52) U.S. Cl. ..................................... 250/380
(58) Field of Classification Search ............ 250/380
See application file for complete search history.

(56) References Cited

U.S. PATENT DOCUMENTS

| | | | |
|---|---|---|---|
| 4,262,203 A * | 4/1981 | Overhoff | 250/374 |
| 4,859,854 A * | 8/1989 | Kershner et al. | 250/374 |
| 4,859,865 A | 8/1989 | Vandenburgh | |
| 4,920,263 A * | 4/1990 | Fimian et al. | 250/255 |
| 5,184,019 A * | 2/1993 | MacArthur et al. | 250/380 |
| 5,514,872 A * | 5/1996 | Bolton et al. | 250/380 |
| 5,550,381 A | 8/1996 | Bolton et al. | |
| 5,831,526 A * | 11/1998 | Hansler et al. | 340/539.14 |

OTHER PUBLICATIONS

Negro V. C: Radometer—"A Portable Field Instrument for the Rapid Measurement of Environmental Radon and Thoron" IEEE Transactions on Nuclear Science. IEEE Inc. New York. US, vol. 37, No. 2, Apr. 1, 1990 pp. 854-858, XP000142938 ISSN: 0018-9499 p. 854 section II-p. 857 section III.

* cited by examiner

*Primary Examiner*—David P Porta
*Assistant Examiner*—Shun Lee
(74) *Attorney, Agent, or Firm*—Olson & Cepuritis, Ltd.

(57) ABSTRACT

In the field of protection from ionising alpha particle radiation there is a need for a low cost, reliable, maintenance free, and self-contained detector that can monitor continuously over a plurality of time periods the levels of airborne alpha particle radiation. The detector operates by measuring the charge created by alpha particle decay between electrodes in an enclosure. Detectors may be linked together to monitor several parts of a building or a large area for applications such as civil emergencies and earthquake warning.

9 Claims, 11 Drawing Sheets

DETECTOR FOR AIBORNE ALPHA PARTICE RADIATION

BACKGROUND OF THE INVENTION

This invention relates to the field of detectors for ionising alpha particle radiation from airborne radioactive nuclei that use ambient air as the detection medium.

The US National Academy of Sciences report BEIR VI (released 19$^{th}$ Feb. 1998) indicates that the pollution of buildings by radon (a naturally occurring radioactive noble gas) causes about 15,000 lung cancer deaths per annum in America and corresponding mortality elsewhere. Radon levels are not predictable: adjacent buildings of similar construction often have very different interior levels of radon and high levels of radon are found over various bed-rocks. The American Environment Protection Agency (EPA) recommends that every dwelling be checked for radon. Fortunately if radon pollution is detected it can be reduced by simple and inexpensive techniques. Continuous measurement of radon is desirable because levels change due to tectonic plate movement, seasonal heating and ventilation changes and building modifications, and to validate protection methods. Additionally radon levels often change before earthquakes. Monitoring radon levels in real time across a large area, for example around known fault lines, and communicating these observations over a network to responsible persons may be used to warn of an imminent earthquake. Because the radiation exposure may vary with time so that e.g. the total exposure over say 24 hours may consist of several hours of high levels of airborne alpha particle radiation with lower levels for the other hours, it is desirable to sample the level of radiation over a plurality of time periods. Other potential sources of airborne alpha particle radiation include plutonium and uranium. Such elements may be put into the atmosphere by mining, accidents at a nuclear reactor or nuclear fuel or weapons processing facility or with a nuclear weapon or weapons, or military conflict with nuclear weapons and or depleted uranium munitions, or military conflict or terrorist action in which sites containing radioactive material are attacked, or by natural disasters such as earthquakes or volcanoes. Following such releases alpha particle radioactive material may remain in the air for considerable periods, or be deposited on the ground and then returned to the atmosphere by winds, agricultural activity, vehicle movement and such. It is desirable to have detectors that provide real time warning of airborne alpha particle radiation. If such airborne radiation is detected, simple actions such as changing building ventilation and/or using simple filters, such as handkerchiefs, over the mouth can reduce exposure and risk of illness. Such detectors may also be networked together to provide an overall picture of the levels of airborne alpha particle radiation.

Two classes of practical alpha particle detectors exist. (1) Low cost devices with no real time monitoring, that are deployed for extended periods. Usually only the integrated radon exposure is determined, often after laboratory processing. (2) Sophisticated and expensive detectors that require skilled operators and which provide real time data. Devices based around ambient air ion counters exist in both classes. Low cost ion counters detect the rate of decay of a charged electrode, such as an electret, caused by ionising radiation. Sophisticated ion counters may detect an integrated direct current caused by atmospheric ionising radiation, or count individual alpha particle decays either with sophisticated low-current measuring apparatus such as KEITHLEY™ (of Ohio, USA) electrometers or with sophisticated digital signal processing (DSP) techniques. Because of the inherent slow charge collection of atmospheric ion counters conventional fast signal shaping can not be used and such detectors are often troubled by microphonics necessitating careful disturbance free siting and/or sophisticated DSP techniques to prevent erroneous measurement. Such requirements are incompatible with the robustness, maintenance free operation and low cost essential for a mass-market detector. All of the prior art has disadvantageous features including expense and sophistication necessitating skilled operation, the long time delay between measurement and results, the absence of long term real-time measurement, the size and bulk of the detectors, and the sensitivity to microphonics. Such disadvantages have prevented the large-scale use of continuous readout radon detectors. There has not previously been a proposal for a truly practical detector for airborne alpha particle radiation that can be sized suitably for domestic applications and which provides continuous measurement over a plurality of time periods, requires minimum maintenance and is easily manufactured from commonly available components, and which does not require a specially trained person to operate.

SUMMARY OF THE INVENTION

According to the present invention there is provided a detector for airborne alpha particle emitting nuclei comprising an electrically screened container with an aperture covered by an electrically screened filter through which radon or other airborne alpha particle radioactive elements can ingress by diffusion into said container and/or with an aperture that may be closed off through which radioactive material such as dust may enter the container through an appropriately sized electrically screened filter, a plurality of electrodes mounted inside and electrically isolated from said container, adjacent electrodes being so separated that a fraction of the radioactive decays occurring within the space between adjacent electrodes may have short tracks striking the insensitive boundaries before producing sufficient numbers of ions to be detected so that the detection efficiency may be less than 100%, a means for providing a substantially smooth high voltage so that an electric field of strength needed to collect air ions produced by alpha particle radioactive decay exists between adjacent electrodes, a means to provide electrical power to an electronic circuit board containing an electronic charge sensitive pre-amplifier and an amplifier with passive feedback components that provides large electronic gain only for the characteristic signals from radioactive decay and low gain for other signals, and an electronic amplifier to amplify signals from a vibration sensor or sensors mounted inside said container, and electronic digital logic circuits, said circuits being so arranged to convert analogue signals from the amplifiers to digital signals, to count the number of ion signals and record the live time when there is no vibration signal or signals and to convert measured decay rates into true decay rates, over a plurality of time periods, a display unit, optical or audio or both, to indicate measured airborne alpha particle rates, and alarms (optical, audio or both) for rates exceeding official safe levels and for dead time.

Specific embodiments will now be described by way of example only and in no way restrictive of the scope of invention with reference to the accompanying drawings.

DETAILED DESCRIPTION OF THE INVENTION

There are three key features of this invention that differ from the prior art. The first is that passive and common feedback components are used with common integrated circuit amplifiers to provide large electronic gain only for the characteristic signals from radioactive decay and low gain for other signals. This excludes the detection of air ions (atoms and molecules of the air that have lost or gained electrons so that they are charged) created by other sources such as electrical storms etc. The use of simple passive feedback components leads to simple manufacturing and reliability. The second is that a vibration sensor or a plurality of such sensors is used to detect disturbances that may otherwise produce erroneous measurements due to microphonics. While such disturbances remain, data acquisition is stopped and the time of stoppage (dead time) noted to facilitate an accurate measurement of the rate of radioactive decay. The third is that the sensitive region of the counter is chosen so that a fraction of the radioactive decays occurring within this region will have short tracks striking the insensitive boundaries before producing sufficient numbers of ions to be detected. The detection efficiency may be less than 100%. By so restricting the dimensions a counter sized convenient for domestic use is possible. Additionally because the first daughter (218 polonium) of 222 radon (the most common pollutant) is formed as a positive ion there is a probability it will become attached to the negatively charged electrode. 218 polonium and another daughter (214 polonium) also emit alpha particles, so that killer a radon 222 nucleus decays, there will, within a few hours, be two subsequent alpha particles. Additionally 210 polonium that is formed via 210 lead (half life 22 years) also emits an alpha particle. Detectors operated in high levels of 222 radon may, after several years, become contaminated with 210 lead and will need cleaning or replacing or the contamination may be modelled and a correction factor based on exposure calculated. The absolute detection efficiency of any given electrode configuration can be determined by placing the detector in an environment of known radioactivity and/or by numerical modelling and comparing the measured or calculated detection rate to the known source, or numerically simulated, strength. The correction factor determined is used to convert measured rates to true levels. It is important to note that only one such measurement or computation is needed for any particular electrode geometry that may be produced. Once a correction factor has been determined for a particular electrode configuration the production of detectors with this electrode arrangement does not require additional correction factors to be determined.

Figure 1:
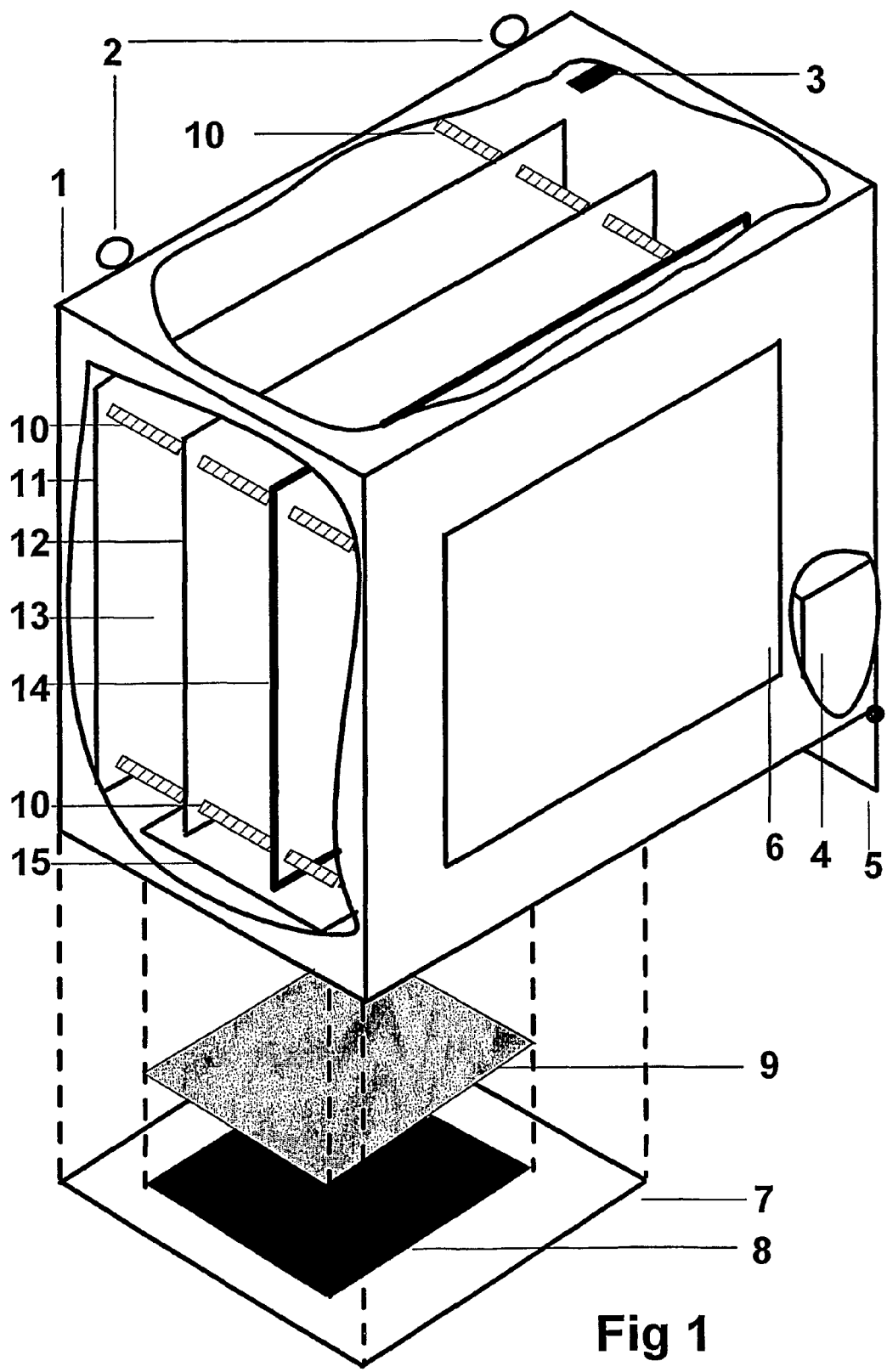
FIG. 1 is a schematic drawing of an embodiment of the invention where the electrodes are two parallel plates.
Figure 2:
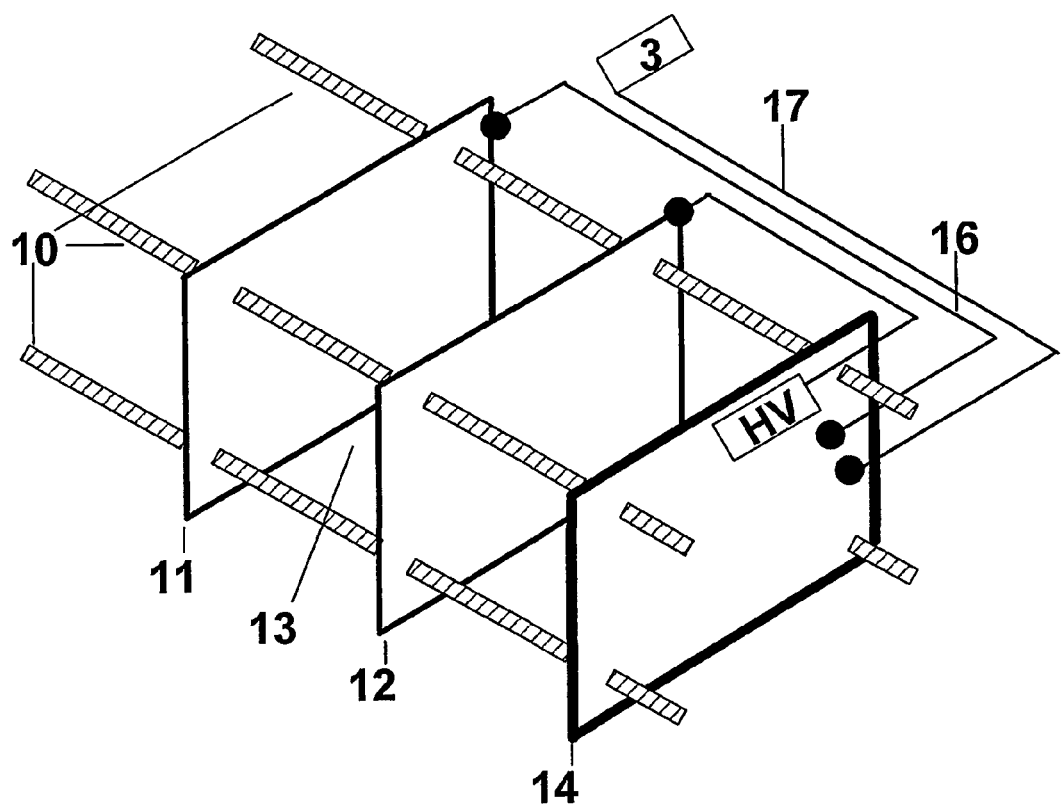
FIG. 2 is a schematic drawing of the electrical connections in one embodiment of the invention where the electrodes are two parallel plates.
Figure 3:
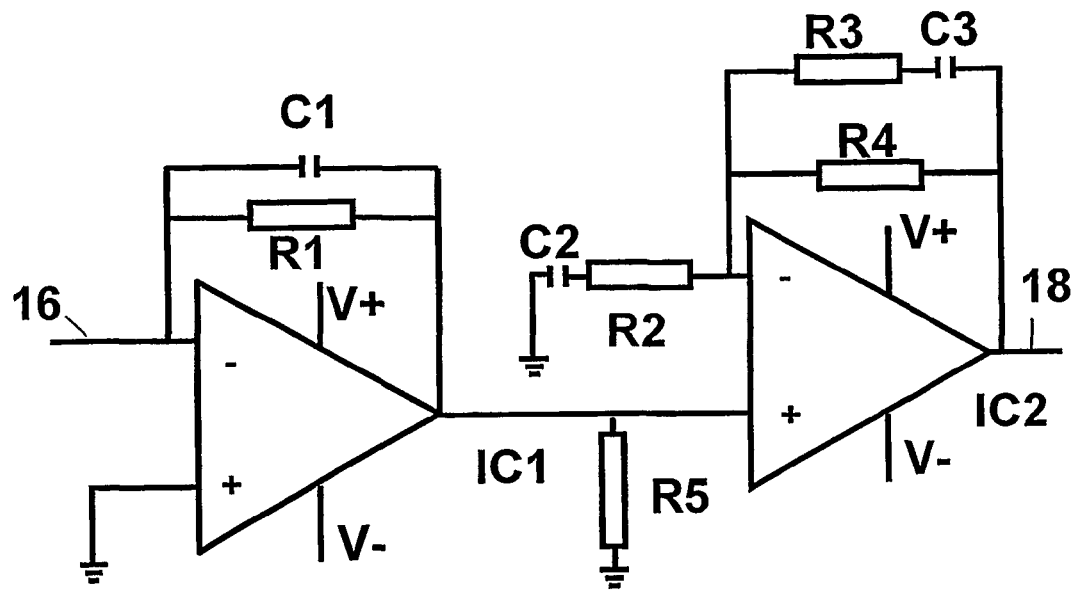
FIG. 3 is a schematic drawing of the electronic amplifiers in one embodiment of the invention.
Figure 4:
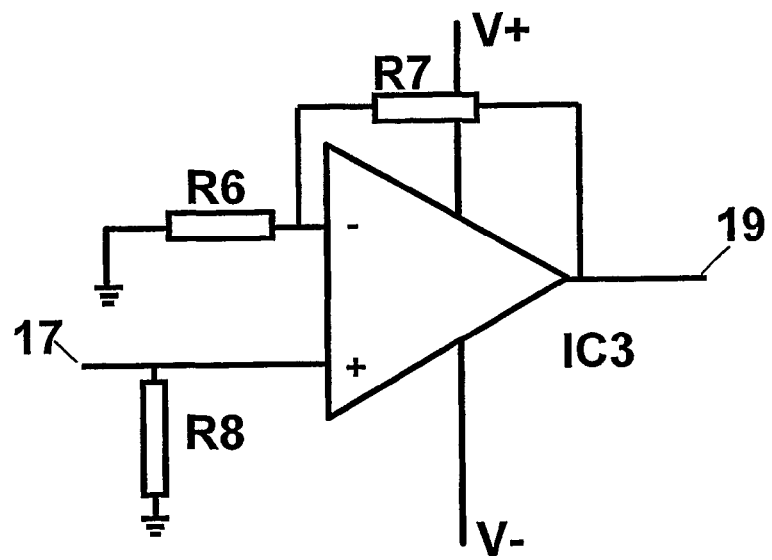
FIG. 4 is a schematic drawing of the electronic amplifier for a vibration sensor in one embodiment of the invention.
Figure 5:
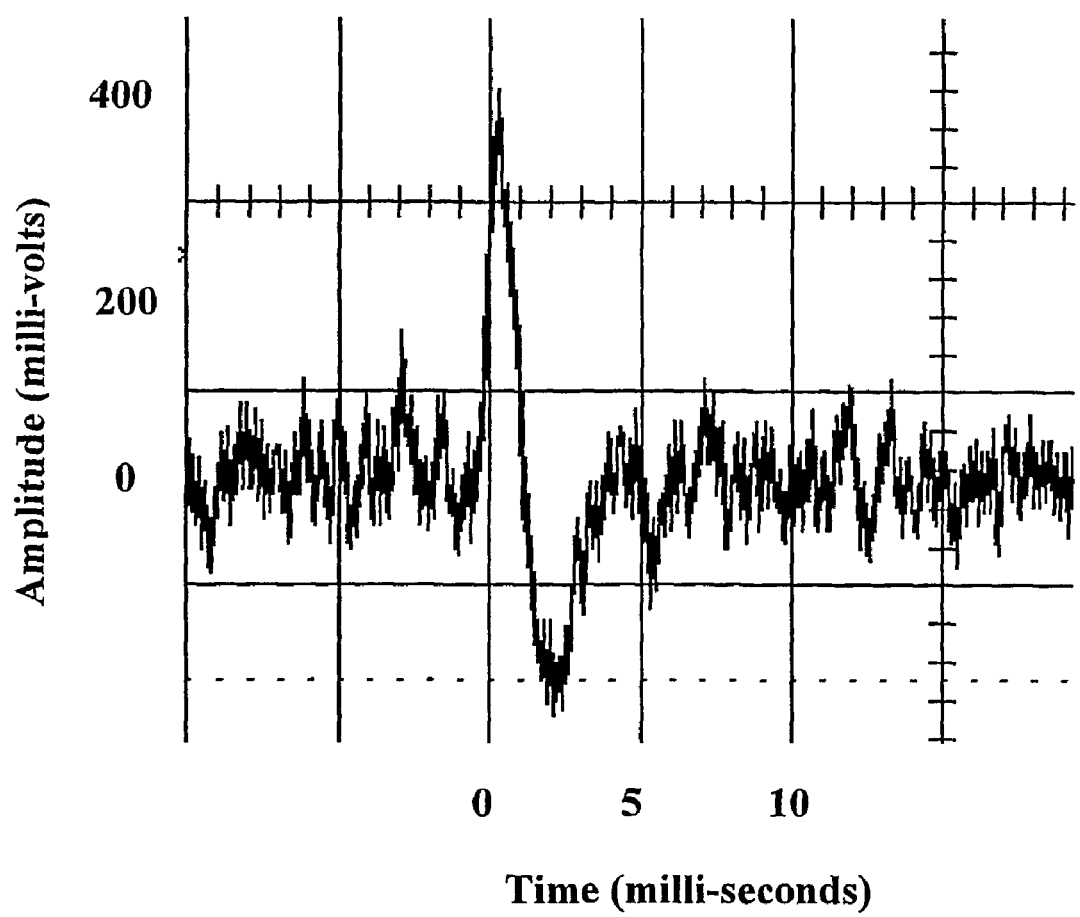
FIG. 5 is a schematic diagram of an amplified waveform of the air ion signal produced by a 5.5 MeV alpha particle in an embodiment of the invention.
Figure 6:
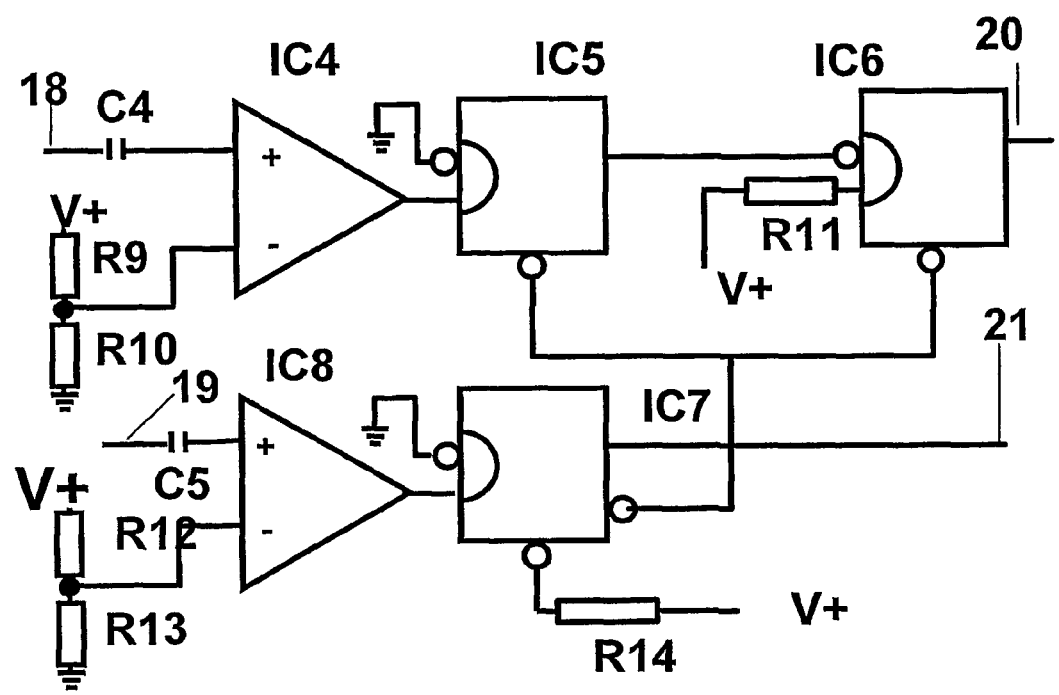
FIG. 6 is a schematic drawing of an electronic digital circuit that may be used to reject counts that are associated with a simultaneous, or shortly thereafter, signal from the vibration sensor in an embodiment of the invention.

As shown in FIG. 1 an embodiment of the invention comprises 1 an electrically screened container (housing) that shields the inside against external electrical interference. It may be secured to a vertical surface such as a dwelling wall using support 2, or it could be secured to a horizontal surface using other (not shown) support and fixing points. Anti-vibration material (not shown) may be used to reduce the intensity of vibration that may be transmitted to the invention. Inside the container (housing) there is provided a vibration sensor 3. A battery or batteries 4 are provided inside the container. These can be inserted by opening electrically conducting flap 5 and then after the batteries are inserted, closing it so as to provide electrical screening. A display and alarm unit 6 is placed on the front of 1. A base 7 containing a fine metallic grid 8 is attached, so as to support filter 9, to container (housing) 1 in such a manner that the filter 9 and grid 8 cover an aperture 15 in 1 so that radon or other radioactive alpha particle emitting gases may diffuse through filter 9 into container (housing) 1 and so as to maintain electrical screening. The filter is also sized to forbid the entry of dust or similarly sized atmospheric pollutants and insects. Four good electrically insulating materials 10, such as TEFLON™, that contains an appropriately strong centre member, provide support and uniformly space apart and electrically insulate from each other electrically conducting plates 11 and 12. A plurality of additional supports (not shown), that provide good electrical insulation and that may also reduce transmitted vibration to plates 11 and 12 and that may also ensure uniform spacing between the plates may be attached to the inner surface of 1. An electronic circuit board 14 is provided within enclosure 1, which may be electrically screened from the plates. One of the plates is connected to a high voltage so that an electrical field (10 to 20 volts/millimeter or larger) of sufficient strength to collect air ions is provided in the space 13 between the plates. The high voltage may be continuously applied from a high voltage battery or a plurality of such batteries, or be applied continuously by an electronic circuit, or the voltage on the plate may be sensed and re-applied when it has fallen, or the voltage may be re-applied at periods sufficiently close together so that a sufficient electrical field to collect ions is maintained between the electrodes. The current consumption of the charged electrode is very low so that a small amount of power is consumed in maintaining the electric field. Power for the electronic circuits may come from a battery or a plurality of batteries, from the mains electrical supply (not shown) or from solar panels (not shown) with backup for hours of darkness (not shown). The high voltage may be derived from a Dry Pile (not shown) sometimes called a Dulac or Zamboni Pile. Such a Pile may be useful for long duration deployment in subterranean sites where long life is needed; Piles have operated continuous for over 160 years. In the case of battery operation when the batteries need replacing, or if they are rechargeable when they need recharging, some method of alerting the user, such as an audio, optical or combination indicator, is provided. The electrical connections to the electrically conducting plates and to the electronic circuit board are shown schematically in FIG. 2. Plate 12 is electrically connected to a source of high voltage and electrically insulated from 1. The air ion signal (not shown) is taken from plate 11, which is electrically insulated from 1, along conductor 16 to the electronic circuit board 14. The vibration sensor 3 is also connected to the electronic circuit board by conductor 17. Electrical connection 16 is connected (FIG. 3) to a charge sensitive amplifier build around IC1 which may be a low cost and low power FET input operational amplifier (such as a TL061 or similar) as shown schematically. The feedback resistor R1 maybe 100 Mega-ohm. It may be coated to minimise charge leakage. The feedback capacitor C1 maybe 1.8 pF. Other values may be used. Connections to the circuit board may be made on to good quality electrical insulators such as TEFLON™ to minimise charge leakage. The output of this amplifier is connected to a second amplifier build around IC2 (which again may be a TL061 or similar) as shown schematically in FIG. 3. The feedback components around IC2 are chosen to give very high gain for the characteristics of the signals produced by air ions (not shown) created by airborne alpha particle radioactivity, and low gain for signals that have different characteristics resulting in minimal sensitivity to air ions not created by ionising alpha particle decay in region 13. The number of air ions that can be created by terrestrial gamma and beta radiation along with secondary radiation from primary cosmic rays in region 13 are too few to be detected. Typical values maybe: R5 is 47 k-ohm, C2 is 0.6 micro-farads, R2 is 500 ohm, R4 is 500 k-ohm, C3 is 640 pF, R3 is 12 k-ohm. Some variations may be made in the magnitude of these components. Other electronic circuits can be used to achieve the required performance. The electrical connection from the vibration sensor is fed to the amplifier built around IC3 (which may be a TL061 or similar) as shown schematically in FIG. 4. R8 may be chosen to match the impedance of the vibration sensor, which for some, such as hi-morph sensors, is typically 1 M-ohm, R6 maybe 1 k-ohm, R7 maybe 1 M-ohm. Some variations in these components may be made. Other electronic circuits can be used to achieve the required performance. For production purposes electronic components with small tolerances can be used to ensure consistent performance or variable resistances may be used allowing fine-tuning of the electronic gains before permanent fixing. Waveforms of the form shown in FIG. 5 (from a 5.5 MeV alpha particle creating an ion-track between two plates after amplification by amplifiers IC1 and IC2), are fed along electrical conductor 18 to a comparator IC4 (which may be a LP339 or similar) (FIG. 6) and if they exceed the pre-set comparator threshold a logic signal is applied to the input of monostable IC5 (which may be a 74HCT423 or similar). If no signal from the vibration sensor exceeds the threshold On the comparator built around IC8 (which may be a LP339 or similar) the signal from monostable IC5 passes through IC6 (which may be a 74HCT423) to give a logic signal 20 to the digital logic circuit (not shown) that eventually drives the alarm and display unit (not shown). The digital logic circuits (not shown) may be implemented in many ways using a variety of electronic circuits and devices that are familiar to those skilled in the art. The alarm and display unit may take many forms and may have optical, audio or a combination of indication and alarm features. However, if there is a simultaneous or shortly thereafter signal from the vibration sensor that is amplified by IC3 to give an output along electrical conductor 19 that does exceed the threshold of the comparator built around IC8 no signal is produced at 20. Instead a signal 21, indicating that the device was not available to count (a 'dead' time), is led to the digital logic circuit (not shown) such that subsequent measurements of the rate of radioactive decays can be corrected to ensure that dead times are not included in the rate calculation. Additionally such dead times may be indicated by optical or audio signal or combination of to the user. Other electronic circuits can be used to achieve the desired performance.

In another embodiment of the invention (not shown) a plurality of vibration sensors with electronics to amplify signals and logic circuits to process these signals are provided within the electrically screened case 1 containing the electrodes. Disturbances that exceed a pre-set threshold or thresholds produce a signal that stops data acquisition (a 'dead time') until such disturbance cease. Such an arrangement would be useful in applications were the invention is subject to disturbances that may not be registered by one vibration sensor.

Figure 7:
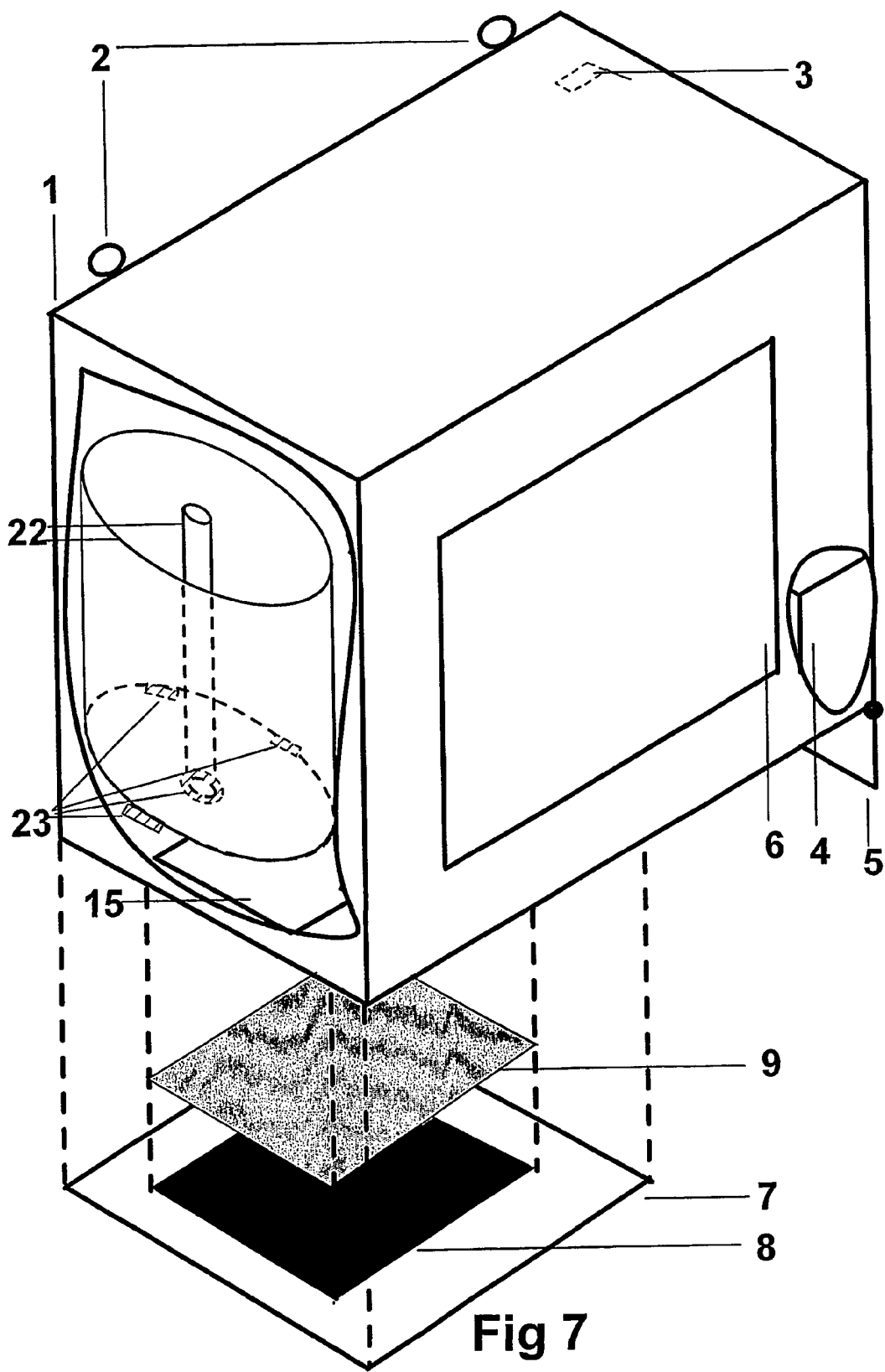
FIG. 7 is an embodiment of the invention where the electrodes are two concentric cylinders.

In another embodiment of the invention (FIG. 7) the electrodes are two concentric electrically conducting cylinders 22 that are placed inside electrically screened enclosure 1 and isolated from the enclosure and spaced by insulators 23. Other electrically insulating supports that may contain vibration reducing materials (not shown) may be used to additionally secure the two electrodes and maintain their spacing to the inner surfaces of 1. Otherwise the mode of operation and associated components (not shown) are similar to those previously described in FIG. 1 to FIG. 6. One practical difference is that higher voltages are generally required between concentric cylinders than between parallel plates to collect air ions (not shown) created by alpha particle radiation.

Figure 8:
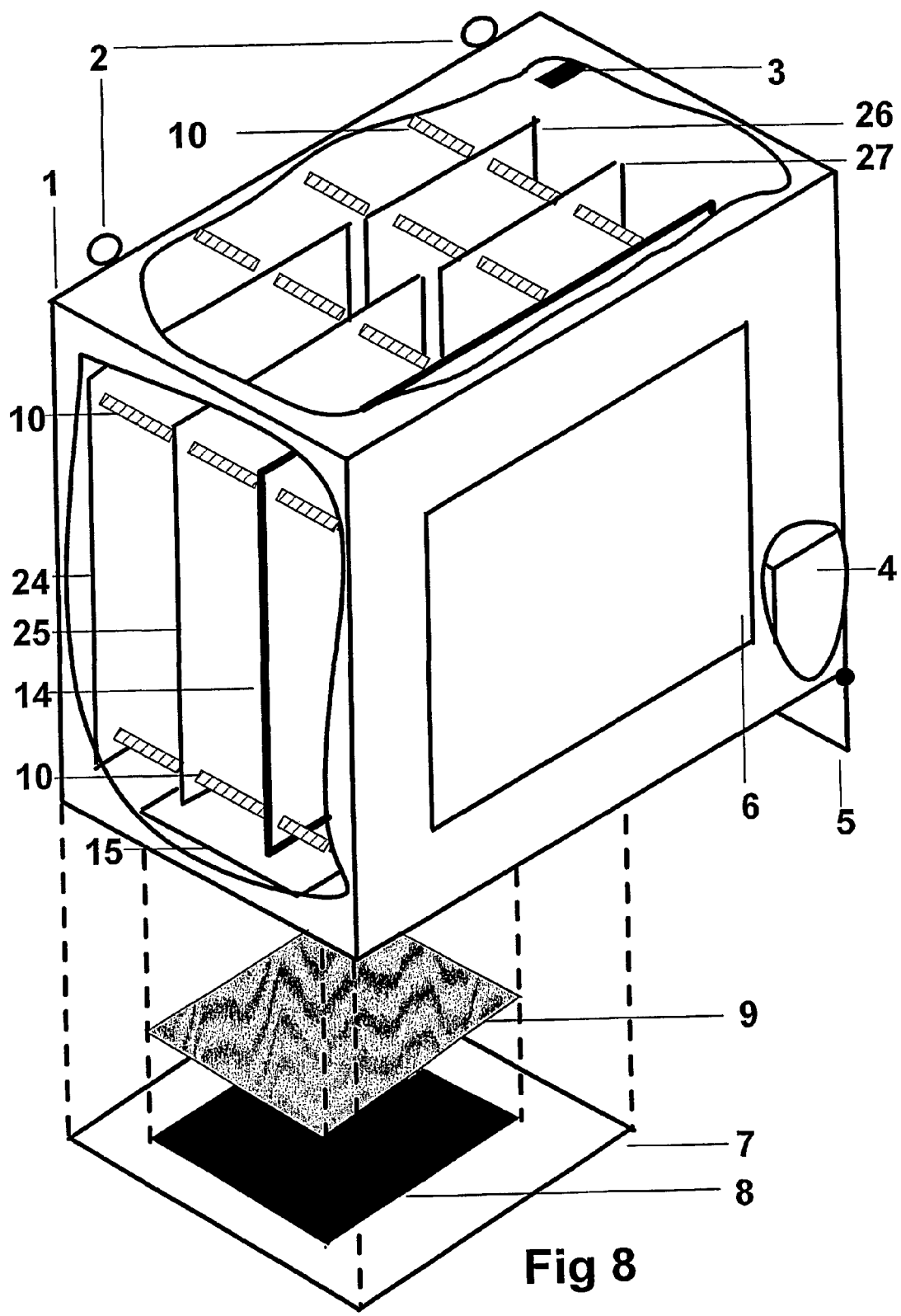
FIG. 8 is an embodiment of the invention where the electrodes are four parallel plates.

In another embodiment of the invention (FIG. 8) four parallel plate electrodes 24, 25, 26 and 27 are contained within enclosure 1. Additional electrically insulating supports (not shown) that may contain vibration reducing materials may be used to uniformly space the electrodes and to secure them to the inside of enclosure 1. Larger numbers of electrodes (not shown) could also be incorporated within the enclosure. Such an embodiment is suited to measurement of high levels of airborne alpha particle radiation were the decays are so numerous that there is an appreciable probability for two decays to take place within the time resolution of the electronics. By using a plurality of electrodes the sensitive volume may be chosen so that at the highest level of radioactivity sampled the probability of more than one detectable decay occurring within the electronic time resolution is small. Accurate measurements can then be made. In this embodiment each adjacent electrode pair is equipped with amplifiers (not shown) and counting electronics (not shown). A plurality of pairs of concentric cylinders (not shown) may also be used.

Figure 9:
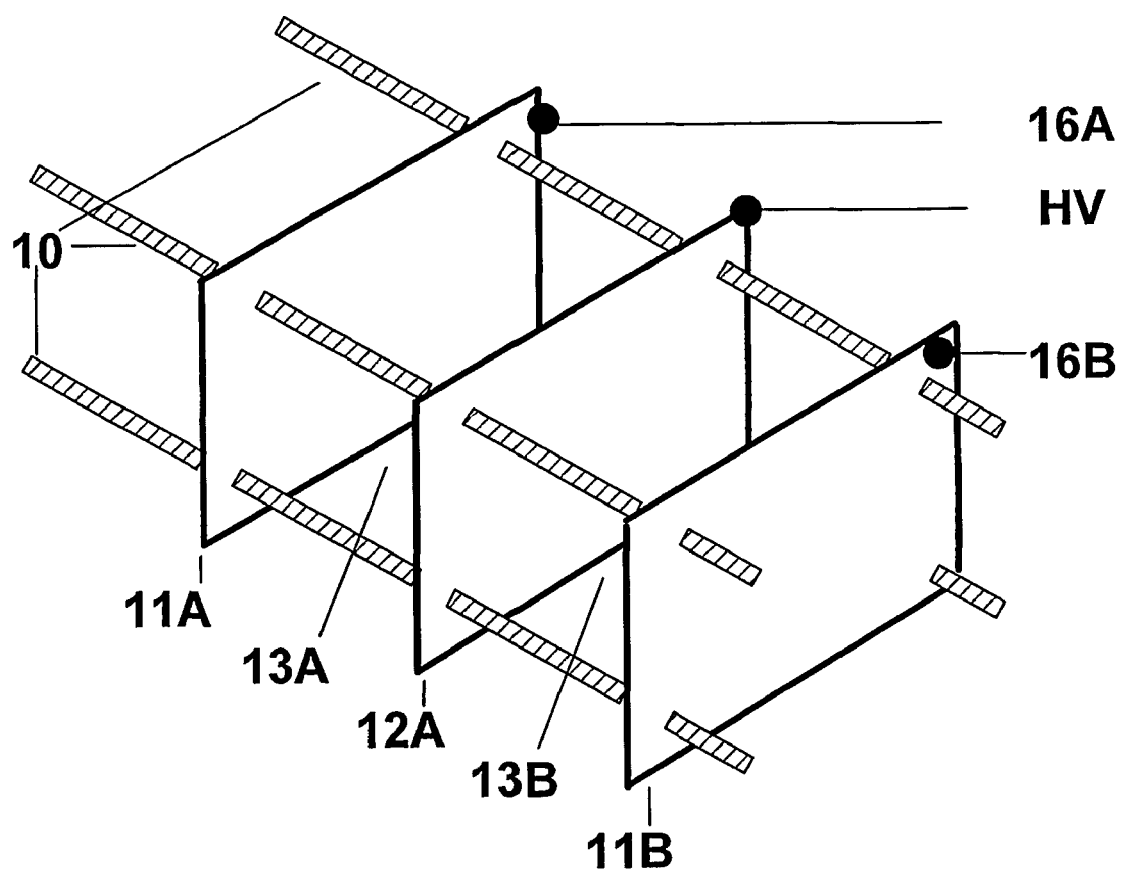
FIG. 9 is a schematic diagram of the electrodes in one embodiment of the invention where the electrodes consist of three parallel plates.

In another embodiment of the invention (FIG. 9) the electrodes consist of three parallel plates. The centre plate 12A is connected to a source of high voltage so that an electric field, sufficient to collect air ions (not shown), exists in regions 13A and 13B, between the centre plate and the other two plates 11A and 11B. Electronic amplifiers (not shown) connected by conductors 16A and 16B are provided to amplify air ion signals (not shown) detected on the two plates. A plurality of three electrode arrangements may be provided within enclosure 1.

Figure 10:
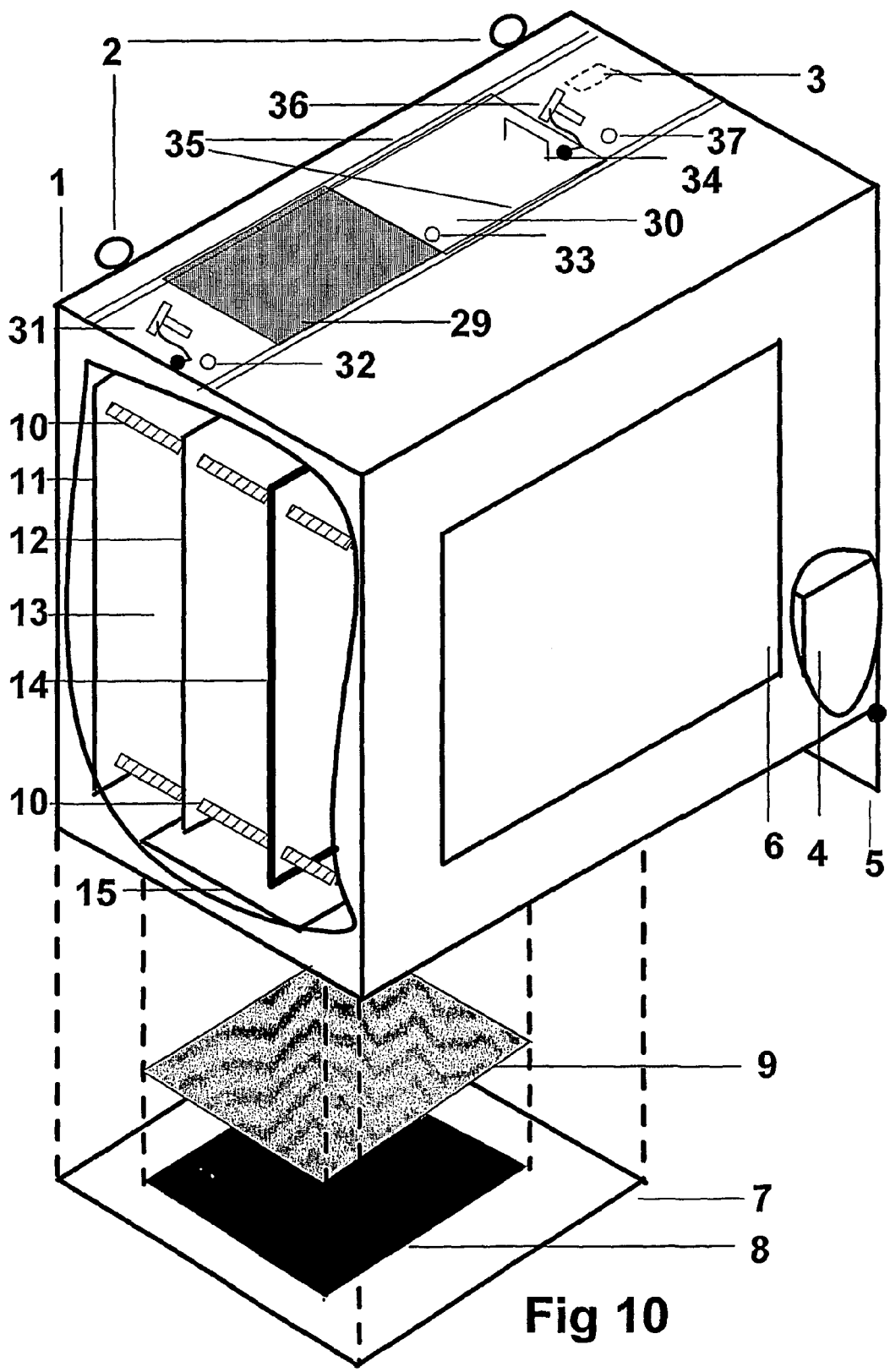
FIG. 10 is an embodiment of the invention where there is provided a moveable cover over an aperture that contains an electrically conducting grid of sufficient size to permit the ingress of radioactive dust between the electrodes inside the electrically screened container.

Another embodiment of the invention is shown in FIG. 10. In this embodiment there is provided a movable cover 30 in enclosure 1 that is placed over an aperture that contains an electrically conducting grid 29 of sufficient size to permit the ingress of radioactive dust, while maintaining electrical screening, into the sensitive region 13 between the electrodes. In normal operation the detector would be orientated so that dust would preferentially fall on this aperture. The cover 30 may be held in place covering grid 29 by pushing fitting 31 through holes 32 and 33. It may be moved by integral moving device 34 while being maintained in contact with the surface of enclosure 1 by guides 35 to a position such that grid 29 is not covered (as shown). It may then be secured by placing fitting 36 into hole 37. Subsequently if desired cover 30 may be moved so that grid 29 is covered. Many movements of the cover are possible. The cover may also be moved by a remotely controlled mechanism (not shown). Such an embodiment would be useful for detecting radioactive airborne alpha particle emitting materials in a form, such as dust when the diffusion of such material into enclosure 1 is unlikely.

In another embodiment (not shown) the apparatus of FIG. 10 is provided without a diffusion aperture so that filter 9 and grid 8 and plate 7 are not required. All other ingress routes are sealed so radioactive nuclei that decay by emission of alpha particles may only enter the interior if cover 30 is moved to uncover grid 29. The cover may also be moved by a remotely controlled mechanism (not shown). Such a detector may have several applications including sampling radioactive dust by moving cover 30 clear of grid 29 and then resealing by moving cover 30 over grid 29. The count rate then measured, after allowing a period for the decay of any radon acquired during the sample period, will be free of radon decays.

Figure 11:
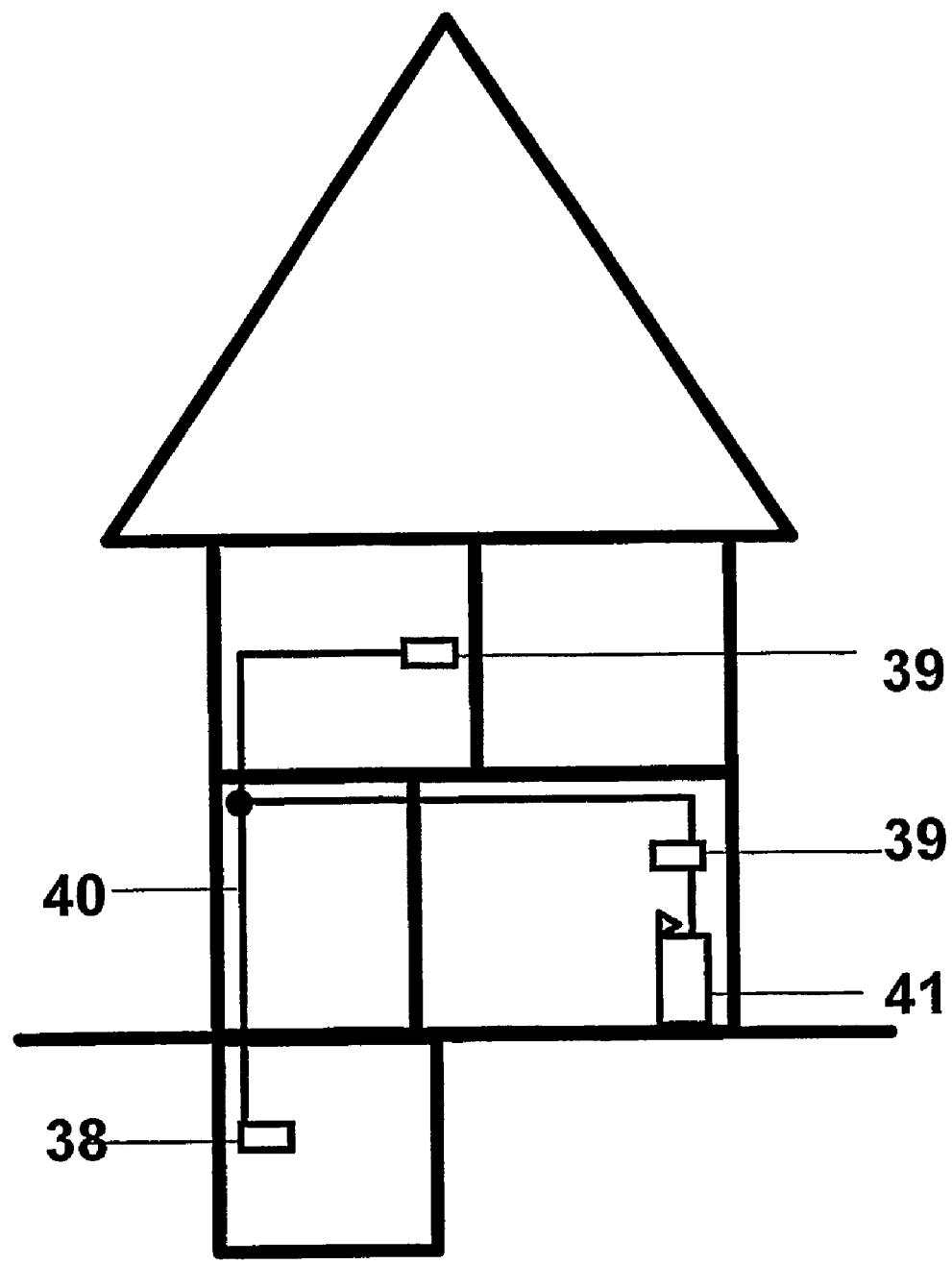
FIG. 11 is a schematic diagram of a deployment of an embodiment of the invention providing whole building monitoring.

In another embodiment a communication device (not shown) is attached to the detector so that the levels of airborne alpha particle radiation measured can be communicated to a plurality of similar detectors placed around a dwelling, office, factory, restaurant, shop or other buildings or in many different buildings. To validate operation and to assist with fault identification, diagnostic information may also be provided by appropriate electronics (not shown) and communicated to responsible persons. This embodiment may also have the ability to detect radioactive dust by moving a cover (not shown) of the form shown in FIG. 10. Thr method of communication may be along electrical wire or wires, optical cable or cables, mains electric cables, by radio or similar means. In some embodiment the alarm and display module on each detector may have the capability (not shown) to indicate if the levels of alpha particle radiation on one or a plurality of other detectors has exceeded official guidelines and indicate which one or ones. For example (FIG. 11) detector 38 placed in an underground room may register high levels of airborne alpha particle radiation while detectors 39 placed in rooms above may not, or vice versa. Additionally the detectors may be linked by suitable connection medium 40 to a computer 41 that with appropriate software can provide more information on the levels of airborne alpha particle radiation within the dwelling, office, factory, restaurant, shop or other buildings. It may also, if the connection to each detector supports duplex communication and each detector contains appropriate electronics (not shown) be used to reset the detectors, to change the detection thresholds and other such tasks as desired by the operator of the system or as may be mandated by future safety legislation.

Figure 12:
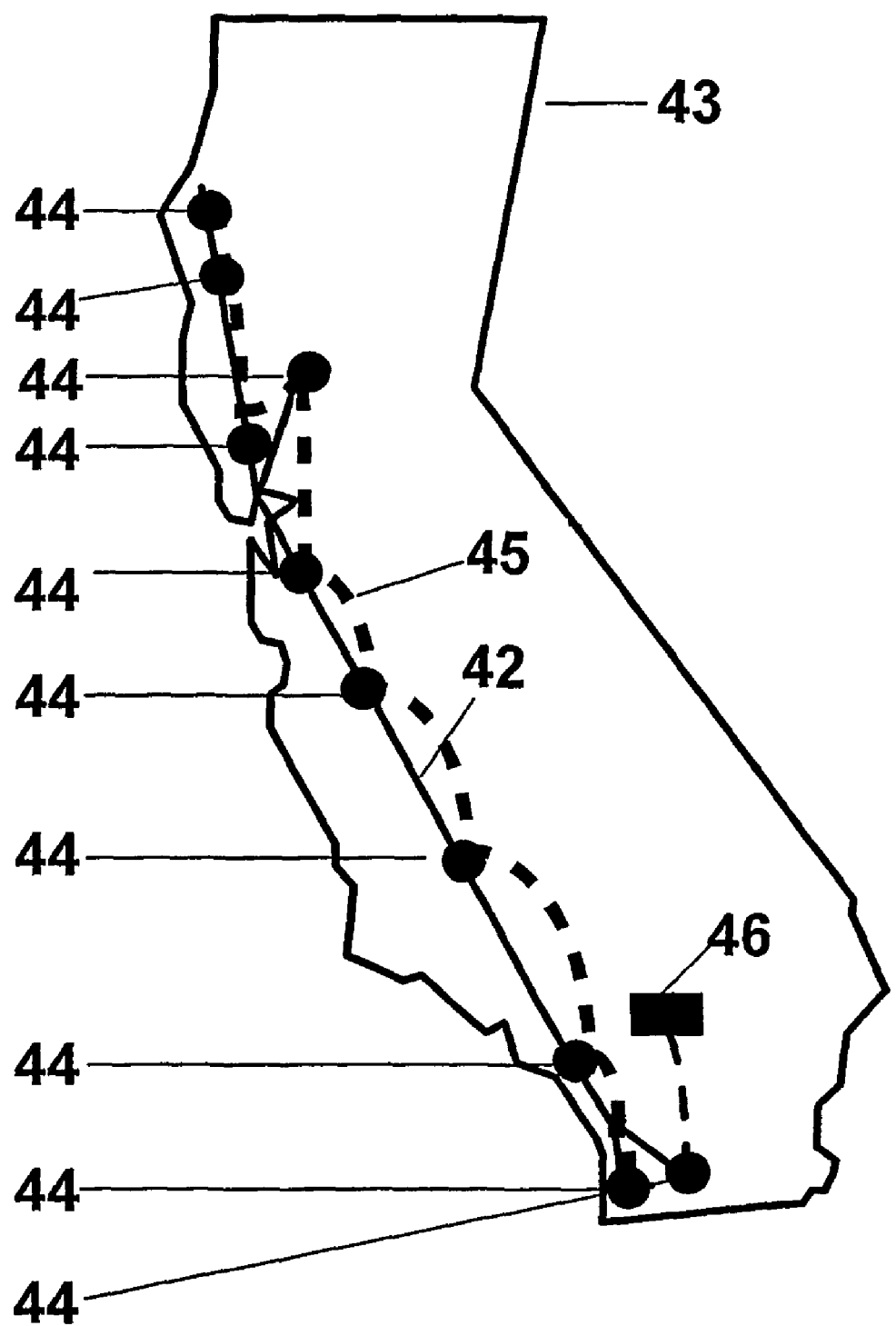
FIG. 12 is a schematic diagram of a deployment of an embodiment of the invention providing monitoring over a large geographical area.

In another embodiment (not shown) the detector is provided with a mechanism whereby it may transmit the measured levels of airborne alpha particle radiation, over the Internet, land-line telephone, fibre-optic network, satellite link, cellular phone or similar communications medium, to a distant office or several such offices. To validate operation and to assist with fault identification, diagnostic information may also be provided by appropriate electronics (not shown) and communicated to responsible persons. This embodiment may also have the ability to detect radioactive dust by moving a cover (not shown) of the form shown in FIG. 10. The invention may be powered (not shown) by batteries, or from the mains grid or from solar cells with backups for periods of darkness or from combinations of, or from other similar supplies. The communication method may be of a duplex nature and electronics within the invention (not shown) may be such that a remote operator can re-set the detector and/or change the threshold levels, the duration over which data are acquired before being reported and similar operations that may be desirable. Such devices may be deployed (FIG. 12) along known geographic fault lines 42 such as in California 43. Only a small number of detectors 44 are shown for illustrative purposes, in practice many more may be deployed, possibly some in subterranean locations, and they may report data along network 45 or various networks (not shown) to one centre 46 (as shown) or several centres (not shown) such as government offices and/or universities.

Although the sensitivity of the detectors to changes in atmospheric pressure, temperature and relative humidity are small, sensors that measure some or all of these quantities or other parameters that may be of interest such as wind speed and/or wind direction, may be incorporated into the alpha particle detectors with appropriate electronics so that corrections to the measured signals may be made and/or, in cases were the detector is equipped with a communication device the value or values may be reported via a communication medium to users of the detector. Such sensor information may also be a useful diagnostic for malfunctioning detectors that are operated remotely. In another embodiment of the invention (not shown) it may be combined with another sensor or a plurality of other sensors such as for smoke, carbon monoxide or optical or infra red cameras for security applications to create a multi-function device that may be convenient for some applications.

The foregoing description of the embodiments of the invention have been presented for purposes of illustration and description. They are not intended to be exhaustive or to limit the invention to the exact forms described. The embodiments were chosen to explain the principles of the invention and its practical applications. Changes may be made without departing from its spirit or affecting the principles upon which it is founded. It is intended that the scope of the invention be defined by the appended claims.

The invention claimed is:

1. A detector for detecting alpha particle radiation from radioactive elements that decay by alpha particle emission and which enter said detector by natural processes of diffusion and/or fallout requiring no forced airflow, comprising:

an electrical conducting enclosure having at least one of a first selectively openable aperture and a second aperture, wherein when the first aperture is open radioactive elements are permitted to enter the electrical conducting enclosure by diffusion or fallout without forced airflow through the first aperture, and wherein radioactive elements are prevented from entering the electrical conducting enclosure through the first aperture when closed and wherein radioactive gases are permitted to enter the electrical conducting enclosure by diffusion without forced airflow through the second aperture;

at least two separated electrodes within said enclosure and electrically insulated therefrom;

a means for establishing and maintaining an electrical field between said electrodes;

a mechanism for sensing by amplifying with large gain the characteristic signals from a radioactive decay by an individual alpha particle occurring within the electric field and with low gain otherwise and producing a signal if the amplified signal exceeds a pre-set threshold responsive thereto and thereafter automatically returning to a state where it can again produce a signal for another individual alpha particle decay;

at least one vibration sensor in communication with said enclosure for detecting vibrations thereof;

a counter responsive to said vibration sensor for counting the number of signals from alpha particle decay as a function of time within the electric field when vibrations sensed by said vibration sensor are below a preselected level and not counting when vibrations sensed by the said vibration sensor are above said preselected level;

a mechanism to determine the rate of alpha particle decay within the field from the count of the number of signals and the time when signals from the vibration sensor are below a preset level;

a mechanism to convert the rate of alpha particle decay in the volume of the electric field to the rate of alpha particle decay in a standard volume using a pre-determined relationship between the electric field volume and the standard volume;

a mechanism to present to the user of said detector the determined rate of alpha particle decay within the standard volume;

a mechanism to present to the user of said detector the time when the signals from the vibration sensor exceed the predetermined levels; and a mechanism to reset the measured level of radioactive decay to zero.

2. The alpha particle detector as described in claim 1 wherein said electrodes consist of a plurality of pairs of substantially parallel and substantially equal sized electrically conducting plates that are separated and opposite.

3. The alpha particle detector as described in claim 1 wherein said electrodes consist of a plurality of three substantially parallel and substantially equal sized electrically conducting plates that are uniformly separated and with one plate opposite the other two.

4. The alpha particle detector as described in claim 1 wherein said electrodes consist of a plurality of pairs of substantially concentric electrically conducting cylinders.

5. The alpha particle detector as described in claim 1 wherein an electrically conducting grid covers any aperture in said enclosure thereby providing electrical screening.

6. The alpha particle detector as described in claim 1 wherein said mechanism for sensing a radioactive decay by an individual alpha particle occurring with the electric field is insensitive to air ions uncharacteristic of radioactive decay.

7. The alpha particle detector as described in claim 1 wherein the volume of the electric field is such that some of said radioactive decay will be undetected.

8. The alpha particle detector as described in claim 1 and further including a mechanism for communicating the rate of alpha particle decay from a plurality of said detectors to provide measurements of alpha particle radioactivity over an extended region, whereby decay from a plurality of points in a dwelling or work place to a fault in the crust of the earth can be calculated and communicated to a computer or to a central location or a plurality of such centers so that a user or users may continuously know the measured levels of alpha particle radiation in a plurality of points that may change due to tectonic plate movement, seasonal changes and building modifications, thereby providing verification of radiation protection methods and/or warning of an earthquake or earthquakes.

9. The alpha particle detector as described in claim 1 wherein said means for establishing and maintaining an electrical field, said mechanism for sensing a radioactive decay, said counter, said mechanisms to determine the rate of alpha particle decay, said mechanism to present to the user of said detector the determined rate, said mechanism to present to the user of said detector the time when vibrations exceed predetermined levels are powered by batteries.

* * * * *

UNITED STATES PATENT AND TRADEMARK OFFICE
CERTIFICATE OF CORRECTION

PATENT NO. : 7,745,799 B2  Page 1 of 2
APPLICATION NO. : 10/381758
DATED : June 29, 2010
INVENTOR(S) : Arthur Smith It is certified that error appears in the above-identified patent and that said Letters Patent is hereby corrected as shown below:

IN THE TITLE, ITEM (54);

In the Patent, in the Title, the word "Aiborne" should read --Airborne--.

In the Patent, in the Title, the word "Partice" should read --Particle--.

IN THE SPECIFICATION:

In the Patent, Column 1, line 1, "Aiborne" should read --Airborne--.

In the Patent, Column 1, line 1, "Partice" should read --Particle--.

In the Patent, Column 1, line 29, "e.g." should read --e.g.,--.

In the Patent, Column 1, line 38, "and or" should read --and/or--.

In the Patent, Column 2, line 61, "DESCRIPTION OF THE DRAWING" should read --DESCRIPTION OF THE DRAWINGS--.

In the Patent, Column 3, lines 59 and 60, "so that killer a radon 222" should read --so that after a radon 222--.

In the Patent, Column 4, line 57, "mains" should read --main--.

In the Patent, Column 5, line 9, "build" should read --built--.

In the Patent, Column 5, line 12, "maybe" should read --may be--.

In the Patent, Column 5, line 14, "maybe" should read --may be--.

In the Patent, Column 5, line 18, "build" should read --built--.

Signed and Sealed this

Fourteenth Day of December, 2010

David J. Kappos
*Director of the United States Patent and Trademark Office*

CERTIFICATE OF CORRECTION (continued)
U.S. Pat. No. 7,745,799 B2

In the Patent, Column 5, line 28, "maybe" should read --may be--.

In the Patent, Column 5, line 37, "hi-morph sensors" should read --bi-morph sensors--.

In the Patent, Column 5, line 37, "maybe" should read --may be--.

In the Patent, Column 5, line 38, "maybe" should read --may be--.

In the Patent, Column 5, line 51, "On" should read --on--.

In the Patent, Column 5, line 67, "(a 'dead' time), is led" should read --(a 'dead' time), is fed--.

In the Patent, Column 6, line 14, "were" should read --where--.

In the Patent, Column 6, line 38, "were" should read --where--.

In the Patent, Column 7, line 35, "Thr" should read --The--.

In the Patent, Column 7, line 37, "mains" should read --main--.

In the Patent, Column 8, line 1, "mains" should read --main--.

In the Patent, Column 8, line 22, "and/or," should read --"and/or"--.

In the Patent, Column 8, line 23, "were" should read --where--.